United States Patent [19]
Plummer

[11] Patent Number: 5,560,118
[45] Date of Patent: Oct. 1, 1996

[54] LINEAR POSITION TRANSDUCER

[76] Inventor: Lew E. Plummer, 400 Tlingit Pl., LaConner, Wash. 98257

[21] Appl. No.: 329,441

[22] Filed: Oct. 26, 1994

[51] Int. Cl.$^6$ ..................................... G01B 7/02
[52] U.S. Cl. ................ 33/709; 33/DIG. 13; 242/376; 73/866.1
[58] Field of Search .................. 33/1 LE, 700, 33/709, 738, 756, 774, 793, 802, 806, 835, DIG. 13; 242/376.1, 376, 399; 73/866.1

[56] References Cited

U.S. PATENT DOCUMENTS

| | | | |
|---|---|---|---|
| 1,405,417 | 2/1922 | Jansson | 33/774 |
| 1,599,780 | 9/1926 | Morehead | 33/774 |
| 2,144,746 | 1/1939 | Thorpe | 33/1 R |
| 2,321,322 | 6/1943 | Ruge | 33/DIG. 13 |
| 2,495,797 | 1/1950 | Whitlock et al. | 33/DIG. 13 |
| 2,546,155 | 3/1951 | Haber et al. | 33/DIG. 13 |
| 2,565,140 | 8/1951 | Leustig | 33/709 |
| 2,742,703 | 4/1956 | Riede | 33/738 |
| 2,761,216 | 9/1956 | Gollub | 33/DIG. 13 |
| 3,643,198 | 2/1972 | Economu . | |
| 3,780,440 | 12/1973 | Taylor | 33/139 |
| 4,037,326 | 7/1977 | Booth et al. | 33/139 |
| 4,090,467 | 5/1978 | Joesting | 33/866.1 |
| 4,130,940 | 12/1978 | Densmore | 33/139 |
| 4,181,959 | 1/1980 | Tateishi | 364/562 |
| 4,181,960 | 1/1980 | Tateishi | 364/562 |
| 4,572,607 | 2/1986 | Krizik | 356/32 |
| 4,718,683 | 1/1988 | Perga | 380/6 R |
| 5,021,648 | 6/1991 | Jones | 250/231.13 |
| 5,035,064 | 7/1991 | Care | 33/760 |
| 5,236,144 | 8/1993 | Kautz | 242/107 |
| 5,244,002 | 9/1993 | Frederick | 137/1 |
| 5,317,931 | 6/1994 | Kalami | 73/866.4 |

Primary Examiner—Thomas B. Will
Attorney, Agent, or Firm—David P. Campbell

[57] ABSTRACT

A linear position transducer (10) including a housing (12), a threaded stud (56) fixedly secured within the housing, a rotatable drum (26) thread-mounted on the threaded stud, a string (18) secured to the drum and extending from the housing, a torsion spring (80) attached to the drum providing retraction torque to the drum, a cantilever beam (28) having one end fixed to the housing and the other end biased against the drum, and a strain gauge (48) for measuring deflection-induced strain in the cantilever beam. The drum moves axially along the threaded stud as it rotates in response to linear movement of the string. As the drum moves axially, it deflects the cantilever beam, which deflection is detected by the strain gauge. The strain is proportional to the linear movement of the free end of the string.

10 Claims, 6 Drawing Sheets

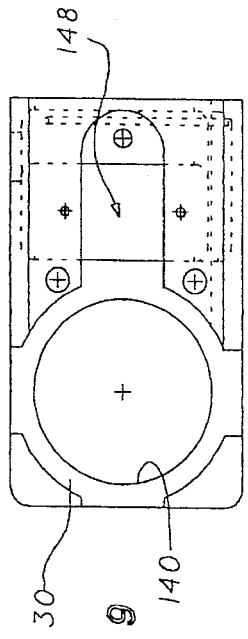
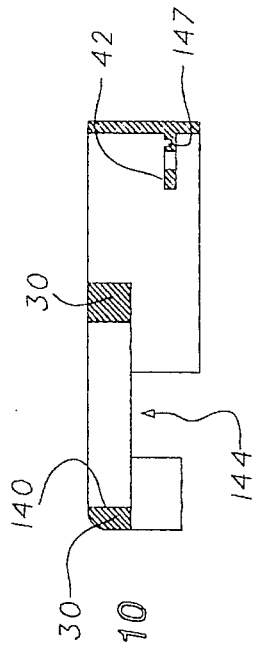
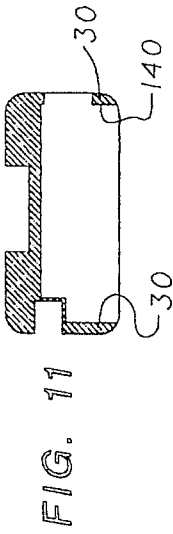
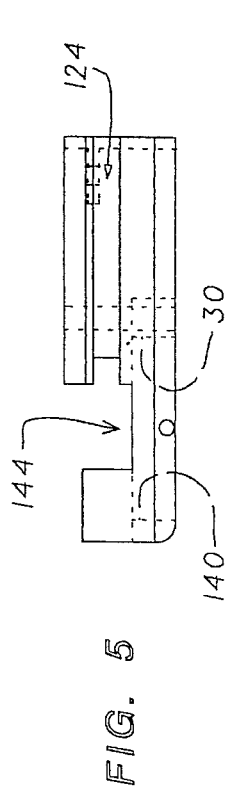
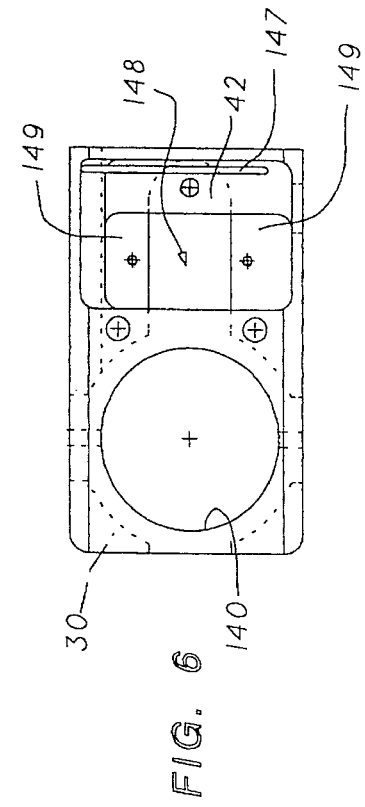
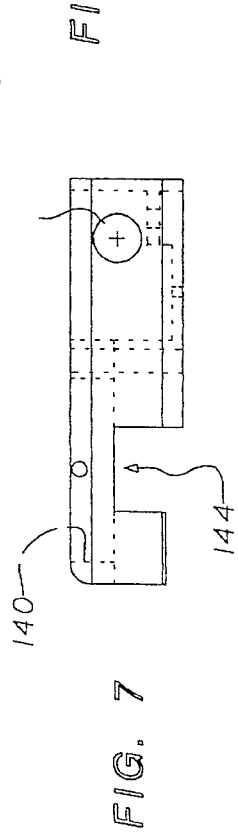
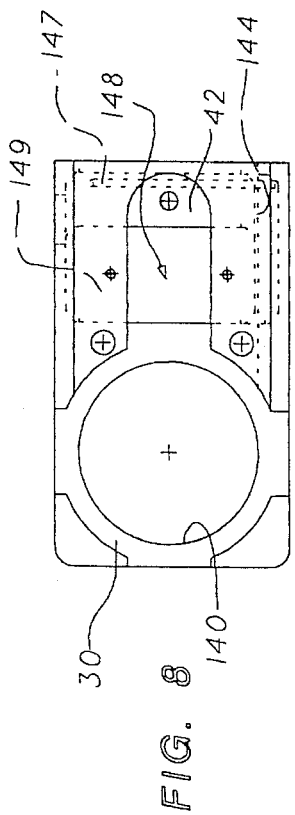

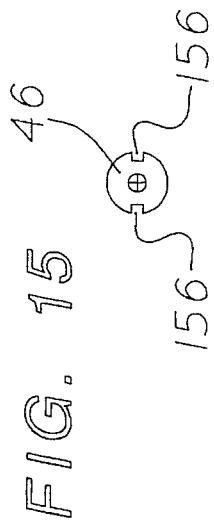
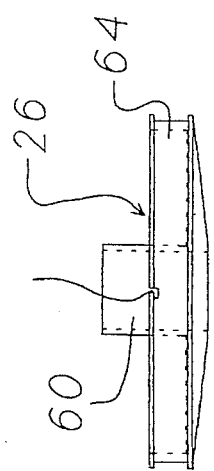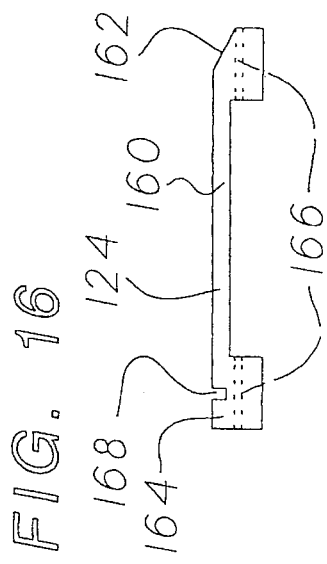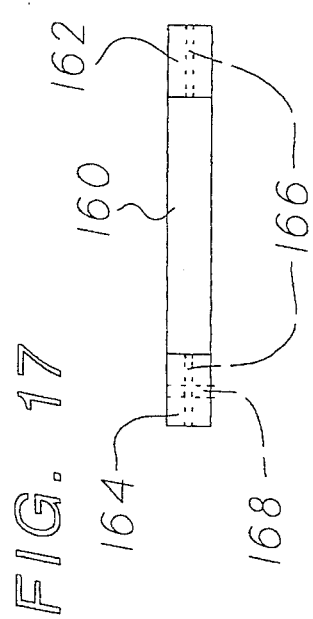
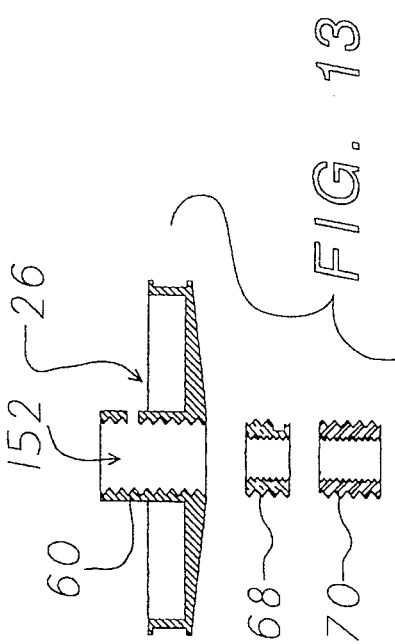

LINEAR POSITION TRANSDUCER

TECHNICAL FIELD

The present invention pertains to linear position transducers, and more particularly, to linear position transducers that translate linear movement into rotary movement.

BACKGROUND OF THE INVENTION

The present invention is an improvement over cable extension potentiometers and other types of linear position transducers that translate linear movement into rotary movement by means of a string and drum. Important considerations in the design of these types of linear position transducers include accurate linear response, increased sensitivity to small linear movements, precise output over a period of repeated use, durable construction in order for the transducer to withstand acceleration and shock, transducer flexibility in handling lateral movements, and simplicity of design for ease of manufacture and replacement of worn parts.

The linear position transducer of the present invention attempts to maximize the foregoing considerations in a transducer that is relatively small in size and light in weight.

The following patents are provided for background purposes: U.S. Pat. No. 5,236,144 of Kautz, titled "Cable Extension Linear Position Transducer," issued Aug. 17, 1993; U.S. Pat. No. 5,021,648 of Jones, titled "Motion Tranducing through Conversion of Linear Motion to Circular Motion," issued Jun. 4, 1991; U.S. Pat. No. 4,181,959 of Tateishi, entitled "Stored Information Transferable Means for a Combined Electronic Digital Scale and Calculator," issued Jan. 1, 1980; U.S. Pat. No. 4,181,960 of Tateishi et al, entitled "Tape Reel and Detector Assembly for an Electronic Combined Digital Scale and Calculator," issued Jan. 1, 1980; U.S. Pat. No. 5,317,931 of Kalami, entitled "Apparatus for Sensing Deflection in a Crash Test Dummy Thorax," issued Jun. 7, 1994; U.S. Pat. No. 5,035,064 of Care, entitled "Linear Measuring Device," issued Jul. 30, 1991; U.S. Pat. No. 4,130,940 of Densmore, entitled "Boom Length Sensing and Indicating System with Self-Synchronization," issued Dec. 26, 1978; U.S. Pat. No. 4,037,326 of Booth et al, entitled "Trolling Apparatus," issued Jul. 26, 1977; U.S. Pat. No. 3,780,440 of Taylor, entitled "Measuring Instrument," issued Dec. 25, 1973.

DISCLOSURE OF THE INVENTION

Briefly described, the linear position transducer of the present invention includes a rotatable drum thread-mounted on a threaded stud fixedly secured with respect to the drum. A signal generating device is provided for sensing axial movement of the drum on the threaded stud as the drum rotates, and producing an output signal proportional thereto. Rotational movement of the drum can be achieved in any number of ways, it being understood that the invention resides in the arrangement of translating rotational movement of the drum into axial movement, which can be more accurately measured as compared to prior art devices.

In a preferred embodiment, the linear position transducer of the present invention comprises a support structure or housing, a threaded stud fixedly secured within the housing, a rotatable drum thread-mounted on the threaded stud, a string secured to the drum and extending from the housing, a torsion spring for providing retraction torque to the drum, a cantilever beam having one end fixed to the housing and the other end biased against the drum, and a strain gauge for measuring deflection-induced strain in the cantilever beam. The drum moves axially along the threaded stud as it rotates in response to linear movement of the string. As the drum moves axially, it deflects the cantilever beam, which deflection is detected by the strain gauge. The strain is proportional to the linear movement of the free end of the string.

The drum includes a first and second threaded insert for thread-mounting on the threaded stud. The threaded inserts are held in an internally-threaded axial passageway in the drum. The threaded connection between the drum and the stud is tightened by rotating the threaded inserts axially along the stud away from each other. This positively engages the threaded inserts with both thread surfaces of the stud and substantially eliminates any play or slack between the drum and the stud.

The relative positions of the cantilever beam and the drum, when the drum is in an initial position with the string wound around the drum, are such that the distal end of the cantilever beam is pre-stressed by the drum. This increases the linear response of the transducer. It also minimizes distortion caused by acceleration of the transducer.

An advantage achieved by the present invention is that the string winds around the drum in a level manner. This advantage is achieved by axial movement of the drum on the threaded stud as the drum rotates. Specifically, the thread pitch of the threaded connection between the threaded inserts and the threaded stud is at least as great as the diameter of the string. Depending on the size of the transducer and the length of the string, the thread pitch can be greater than the width of the string.

A plastic guide is provided at the exit point of the string from the housing. The plastic guide includes a hole through which the string passes. Preferably, the guide is made of a durable material, such as UHMW polyethylene, so that lateral movement of the string does not cause excessive wear on the guide.

Preferably, the distal end of the cantilever beam contacts the drum at the center of the drum. A cap or button is provided to cover one end of the axial passageway in the drum. The button provides a solid surface at the center of the drum against which the distal end of the cantilever beam is biased. A bead is provided at the underside of the distal end of the cantilever beam. The bead contacts the cap or button, and maintains the position of the cap or button relative to the cantilever beam, in order to maintain the linear response of the transducer.

The design of the present invention provides an extremely linear output over the elastic range of the cantilever beam. Distortion is minimized and a step function output is avoided, as commonly occurs with potentiometers.

The design also includes relatively few parts, which allows the size of the transducer to be reduced, and keeps the overall weight of the transducer low. The transducer is also extremely durable and can withstand acceleration forces as well as shock, such as occurs when the transducer is dropped.

It is an object of the present invention to provide a transducer for converting rotational movement of a drum into axial movement in a manner producing an output signal proportional to the rotation of the drum.

These and other advantages, features, and objects of the present invention will become apparent from the following disclosure of the best mode for carrying out the invention, the claims, and the drawings, which are all incorporated herein as part of the disclosure of the invention.

BRIEF DESCRIPTION OF THE DRAWINGS

Like reference numerals refer to like parts throughout the several views, wherein:

FIGS. 5–11 are various views illustrating the design of the base structure member that forms part of the transducer housing;

FIG. 12 is a side elevation view of the drum around which the string winds;

FIG. 13 is an exploded sectional view of the drum of FIG. 12 and two threaded inserts as well as an actuator button;

FIG. 14 is an assembled view of the components of FIG. 13;

FIG. 15 is a plan view of the actuator button of FIG. 13;

FIG. 16 is a plan view of a plastic string guide that is positioned at the exit point of the string from the housing;

FIG. 17 is a side view of the string guide of FIG. 16;

BEST MODE FOR CARRYING OUT THE INVENTION

Figure 1:
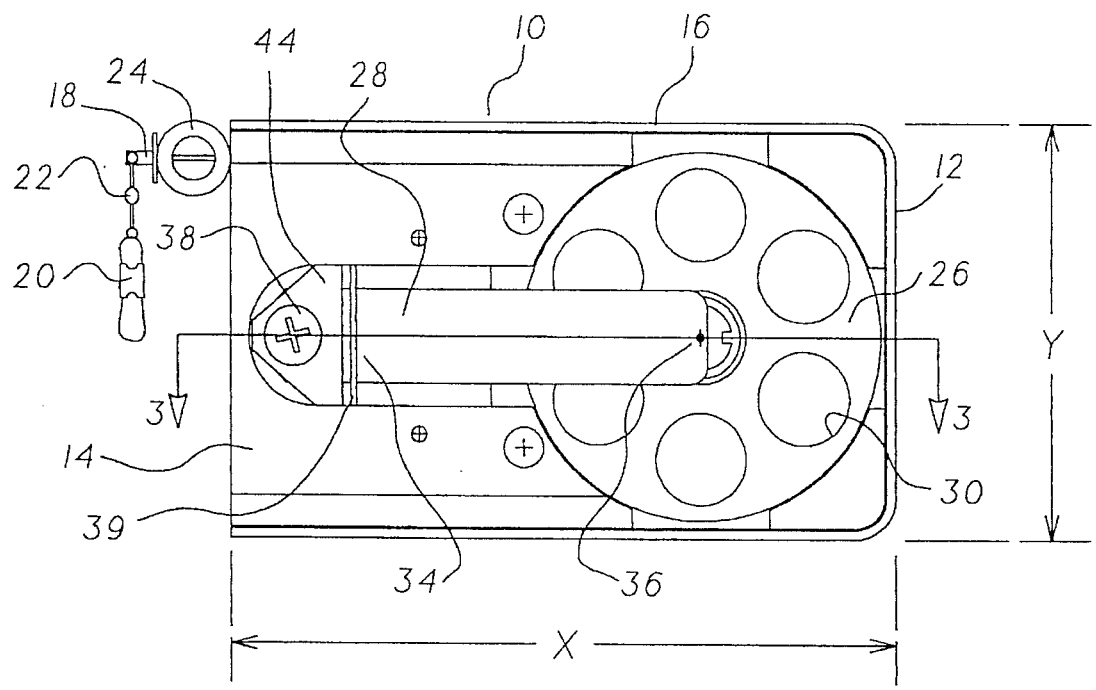
FIG. 1 is a plan view of the linear position transducer of the present invention.
Figure 2:
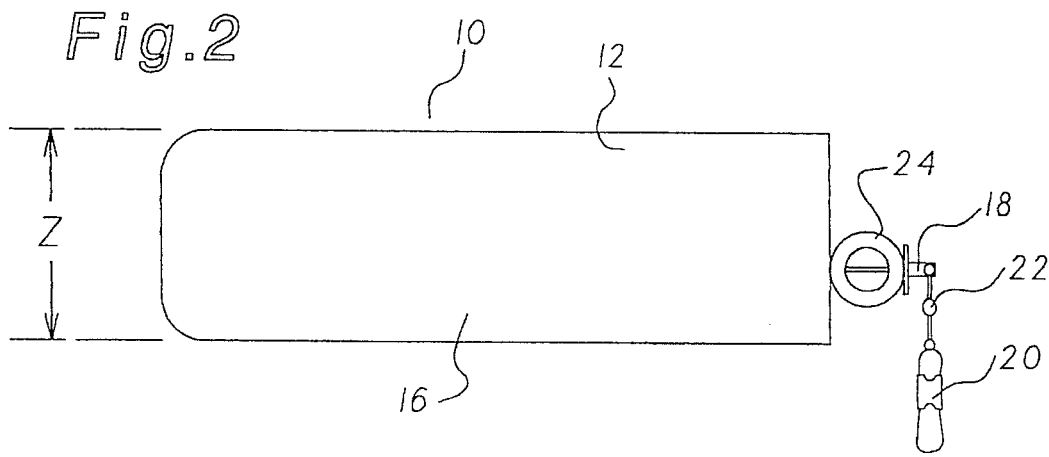
FIG. 2 is a side elevation view of the linear position transducer of FIG. 1.

Referring now to the drawings, FIGS. 1 and 2 show a linear position transducer 10 made in accordance with a preferred embodiment of the present invention. The transducer 10 includes a rectangular housing 12 that is approximately 3.6 inches in length, as indicated by distance X; 2.3 inches in width, as indicated by distance Y, and approximately 1.0 inch in height, as indicated by distance Z. Housing 12 includes a base structure 14 and a cover 16. Base 14 and cover 16 are made of aluminum for durability and low weight, but could be made of other suitable materials, such as structural plastic. The size of transducer 10 can vary depending upon the application or length requirements for an extension cable.

Transducer 10 includes an extension cable or string 18, which extends out one side of housing 12. String 18 can be any type of string or cable that is flexible enough to be wound yet durable enough to withstand repeated reciprocating use and acceleration forces. In the preferred embodiment, string 18 is made of 7-strand stainless steel. The length of string 18 can also vary depending on the application.

A relatively small finger-sized handle 20 including a swivel 22 is provided at a free end of string 18. String 18 also includes a stop ring 24 spaced from handle 20. Stop ring 24 abuts the side of base 14 to provide a cushion against which handle 20 can act and to prevent string 18 and handle 20 from retracting all the way into housing 12.

FIG. 1 also shows a circular wheel or drum 26 rotatably mounted within housing 12 and an elongated cantilever beam 28. Drum 26 includes round angularly spaced holes 30. Holes 30 are provided to lighten drum 26, which preferably is made of aluminum. Cantilever beam 28 includes a first end 34 and a second, distal end 36. First end 34 is secured fixedly to base 14 by means of a screw 38 and clamp 44, and second end 36 contacts drum 26 and is biased against the center part of the drum, as discussed later. FIG. 1 also shows a strain gauge sensitivity adjuster 39, discussed in more detail with reference to FIG. 18.

Figure 3:
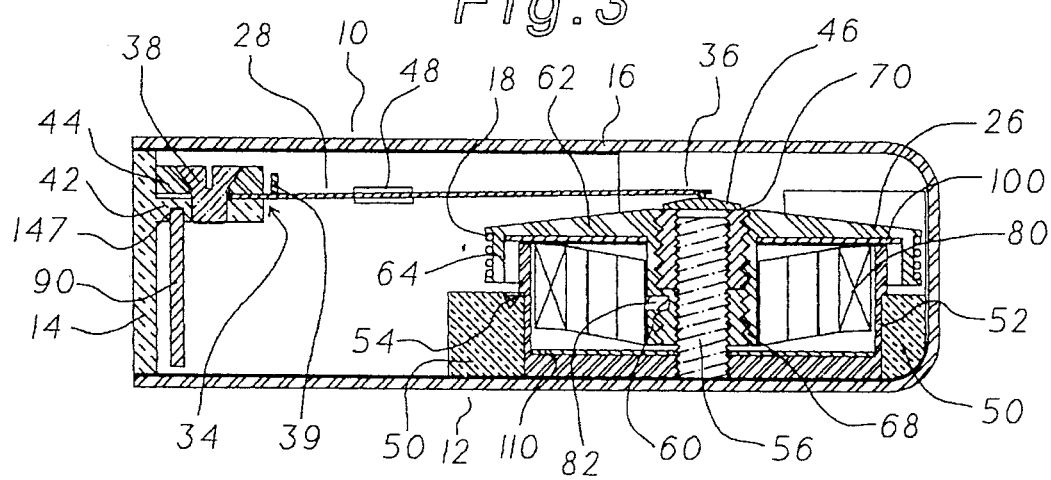
FIG. 3 is an enlarged sectional view taken along the lines 3—3 of FIG. 1 showing the internal components of the linear position transducer shown in FIG. 1.

In FIG. 3, transducer 10 is shown in cross-section. Base 14 includes a short ledge 42 for supporting first end 34 of cantilever beam 28. A clamp block 44 is provided to receive screw 38 and fixedly secure first end 34 to ledge 42. Second end 36 of cantilever beam 28 is biased against an actuator button 46 carried by drum 26. The relative positions of cantilever beam 28 and drum 26 are such that cantilever beam 28 is always deflected to some degree by contact of actuator button 46 with distal end 36. Preferably, cantilever beam 28 is made of stainless steel. A strain gauge 48 is affixed on cantilever beam 28. Strain gauge 48 is shown schematically in FIG. 3. Deflection-induced strain in cantilever beam 28 is measured by strain gauge 48. Strain gauge sensitivity adjuster 39 is adjustable along a portion of the length of cantilever beam 28. Sensitivity adjuster 39 abuts cantilever beam 28 to affect the deflection point of cantilever beam 28, which controls the sensitivity of strain gauge 48.

Base 14 is described in more detail with reference to FIGS. 5–11. However, in FIG. 3, a circular drum support portion 50 of base 14 is partially shown. A circular spring retainer cup 52 is held within drum support 50 by a pair of set screws (not shown). Spring retainer cup 52 includes a shoulder portion 54, which rests against upper corner edges of drum support 50, and positions the bottom of cup 52 flush with the bottom of drum support 50.

A threaded stud 56 is thread-mounted to spring retainer cup 52 at its center. Threaded stud 56 provides an axis around which drum 26 rotates. Drum 26 includes a central hub 60 circumscribed at one end by a disc portion 62. Disc portion 62 is tapered toward its periphery. A spool portion 64 at the perimeter of disc 62 receives helically wound string 18. Central hub 60 receives a pair of threaded inserts 68,70 for threadedly, rotatably coupling drum 26 to threaded stud 56. Threaded inserts 68,70 are discussed in more detail later.

Actuator button 46 is silver soldered to threaded insert 70. Actuator button 46 caps threaded insert 70 and provides a solid surface at the center of drum 26 to contact and deflect second end 36 of cantilever beam 28. Actuator button 46 preferably is made of steel.

A constant-force torsion spring 80 is carried within drum 26 between central hub 60 and spring retainer cup 52. An outer end of torsion spring 80 is fixed to the inner wall of spring retainer cup 52, and an inner end of torsion spring 80 is fixed to central hub 60 by means of a spring retainer pin 82. Spring retainer pin 82 also secures central hub 60 from rotational movement about threaded insert 68.

Transducer 10 also includes a printed circuit board 90 secured within housing 12 to base 14. Printed circuit board 90 provides electrical connections between strain gauge assembly 48 and a connector outlet (not shown). Strain gauge assembly 48 can include any type of strain gauge well known in the art. Preferably, a four strain gauge bridge is used, such as model M-M TK-06-S082R-350, 2 gauges per side, available from Micro-Measurements Division, Measurements Group, Inc., Raleigh, N.C., U.S.A.

Figure 4:
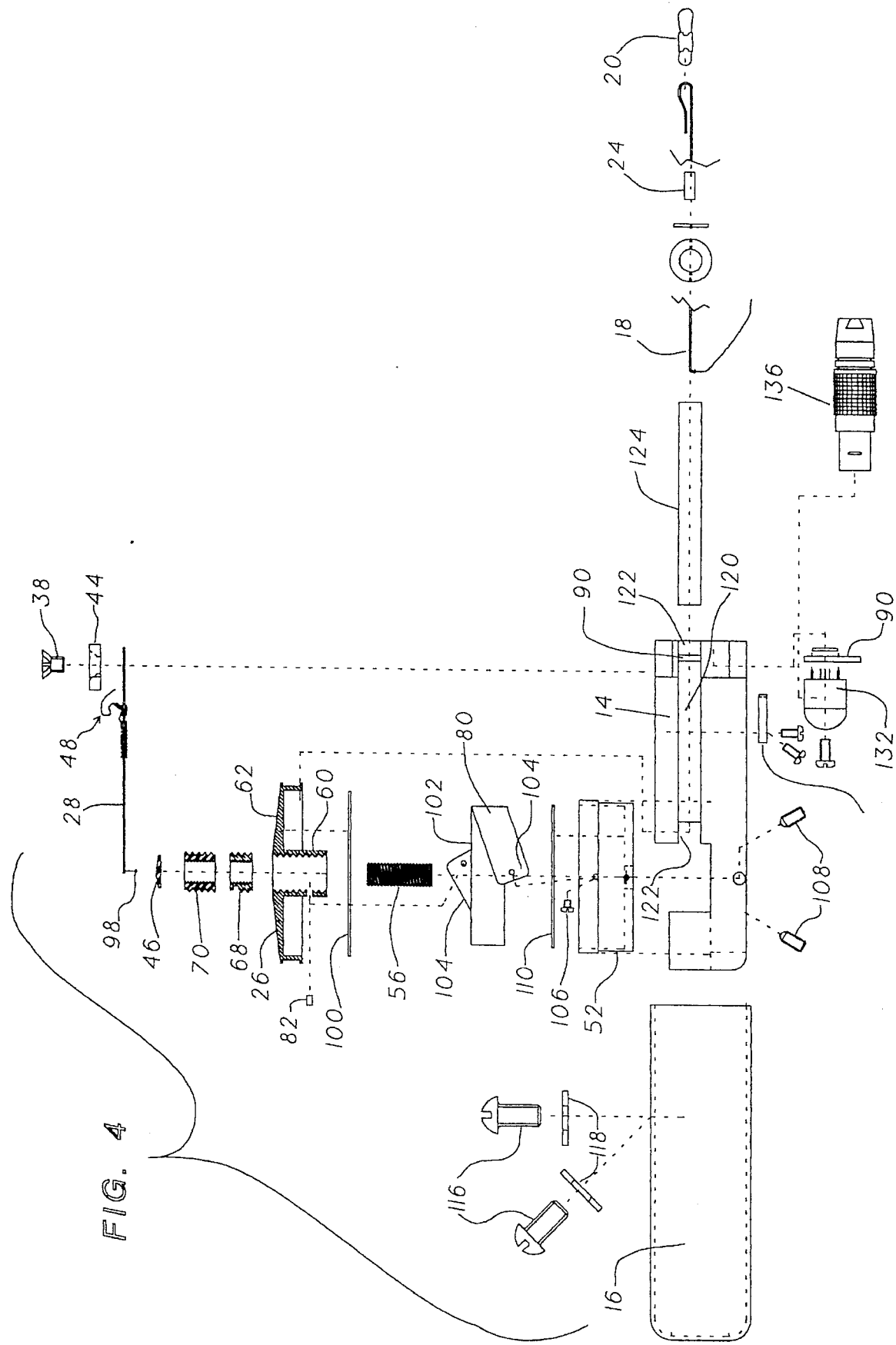
FIG. 4 is an exploded view of the linear position transducer of FIG. 1.

In FIG. 4, all parts of linear position transducer 10 are shown in exploded format. Parts not previously discussed include a bearing ball 98 mounted beneath distal end 36 of cantilever beam 28. Bearing ball 98 bears against actuator button 46. Preferably, distal end 36 of cantilever beam 28 has a small hole provided along its centerline, which hole is smaller than the diameter of bearing ball 98. Bearing ball 98 is placed in this hole and a small amount of solder is dabbed into the hole for fixedly securing bearing ball 98 to beam 28. It is necessary to provide bearing ball 98 in order to maintain the linear response of the transducer. As drum 26 rotates in response to movement of string 18, actuator button 46 moves axially and deflects distal end 36 of cantilever beam 28. As cantilever beam 28 deflects, there is relative longitudinal movement between actuator button 46 and cantilever beam 28. Bearing ball 98 keeps the point of contact between the cantilever beam and the actuator button constant relative to the fixed end 34 of the cantilever beam. By keeping the contact point of actuator button 46 against cantilever beam 28 constant in relation to fixed end 34, the linear response of the transducer is maintained.

A flat circular wear disc 100, having a center hole (not shown) for receiving central hub 60 of drum 26, is positioned between disc portion 62 of drum 26 and the top edges 102 of torsion spring 80. Wear disc 100 preferably is made of a durable material having a low coefficient of friction, such as oil-impregnated fiberglass. Torsion spring 80 includes tabs 104, one at each of its ends, one of which receives a set screw 106. A second flat circular wear disc 110 is positioned between the bottom edges of torsion spring 80 and the interior surface of spring retainer cup 52.

A pair of screws 116 and washers 118 are provided to secure cover 16 to base 14 of the transducer housing. A pair of set screws 108 secure spring retainer cup 52 at its base to the base 14 of transducer 10.

Base 14 includes along one of its sides an elongated channel 120 extending between openings 122. A correspondingly shaped elongated plastic string guide 124 snaps into channel 120 and is securely held therein by means of the printed circuit board 90. This arrangement is discussed later. String guide 124 includes a central passageway (not shown) through which string 18 moves back and forth. String guide 124 ensures that string 18 controllably unwinds and rewinds around drum 26. String 18 includes a bead 126 for securing string 18 to drum 26.

A printed circuit board connector 132 plugs into PC board 90 electrically connecting strain gauge assembly 48 to PC board 90. A seven contact connector 136 is provided for connection to suitable strain gauge calibrating equipment.

FIGS. 5–11 illustrate base 14 in more detail. Base 14 generally is rectangular in shape and includes a large round opening 140, which is formed by drum support disc portion 30. One face of base 14 includes a large channel region 144, which is adjacent string channel 124. Channel region 144 provides room for the string to exit the string guide and wind around the drum. Base 14 also includes an inlet region 148 adjacent circular opening 140 and extending to ledge 42. Inlet region 148 provides space for the cantilever beam to deflect. Straddling inlet 148 is a pair of impressions 149. The strain gauge sensitivity adjuster mounts to base 14 within impressions 149. Base 14 also includes an elongated slot 147 for receiving the PC board and a circular side opening 150 for the printed circuit board connector. Base 14 is made of aluminum and can be either cast or machined.

FIGS. 12–15 illustrate the design of drum 26. Spool portion 64 of the drum 26 includes a notch 151 for receiving the bead at the end of the cable string. Central hub 60 of drum 26 includes an internally threaded axial passageway 152. The length of axial passageway 152 is slightly longer than the combined length of threaded inserts 68,70. This allows a limited amount of travel within axial passageway 152 for threaded insert 70. During assembly, threaded inserts 68,70 are threaded into axial passageway 152, and then drum 26 and threaded inserts 68,70 are threaded onto the threaded stud. Spring retainer pin 82 secures threaded insert 68 to drum 26. Preferably, a non-permanent chemical thread locking material, such as Lock-tite™, is used to secure threaded insert 70 to drum 26. Such a thread locking material allows for a limited amount of adjustment of threaded insert 70 within axial passageway 152. Should there be any play or slack between the threaded inserts 68,70 and the threads of the threaded stud, insert 70 can by rotated in or out toward or away from insert 68, in order to engage the insert's threads positively against both thread surfaces of the threaded stud. Such an adjustment increases the accuracy of the transducer.

Actuator button 46 is shown in FIGS. 13–15, and includes a pair of notches 156. Notches 156 serves several purposes. First, notches 156 allow for use of a wrench to adjust threaded insert 70, to which actuator button 46 is mounted. Second, notches 156 provide a small passageway to the interior area 157 (FIG. 14) of threaded insert 70. This passageway allows air to move in and out of space 157 as drum 26 rotates. Third, notches 156 allow for oiling of threaded stud 56, which is advisable to ensure easy rotation of drum 26.

FIGS. 16, 17 illustrate string guide 124. Guide 124 includes an elongated thin central portion 160, an inner guide block 162, and an outer guide block 164. Guide blocks 162, 164 each include a passageway 166 for receiving the string. Outer guide block 164 includes a notch 168 for receiving an edge of the PC board. The inter-engagement of the PC board and notch 168 keep string guide 124 held to base 14.

Figure 18:
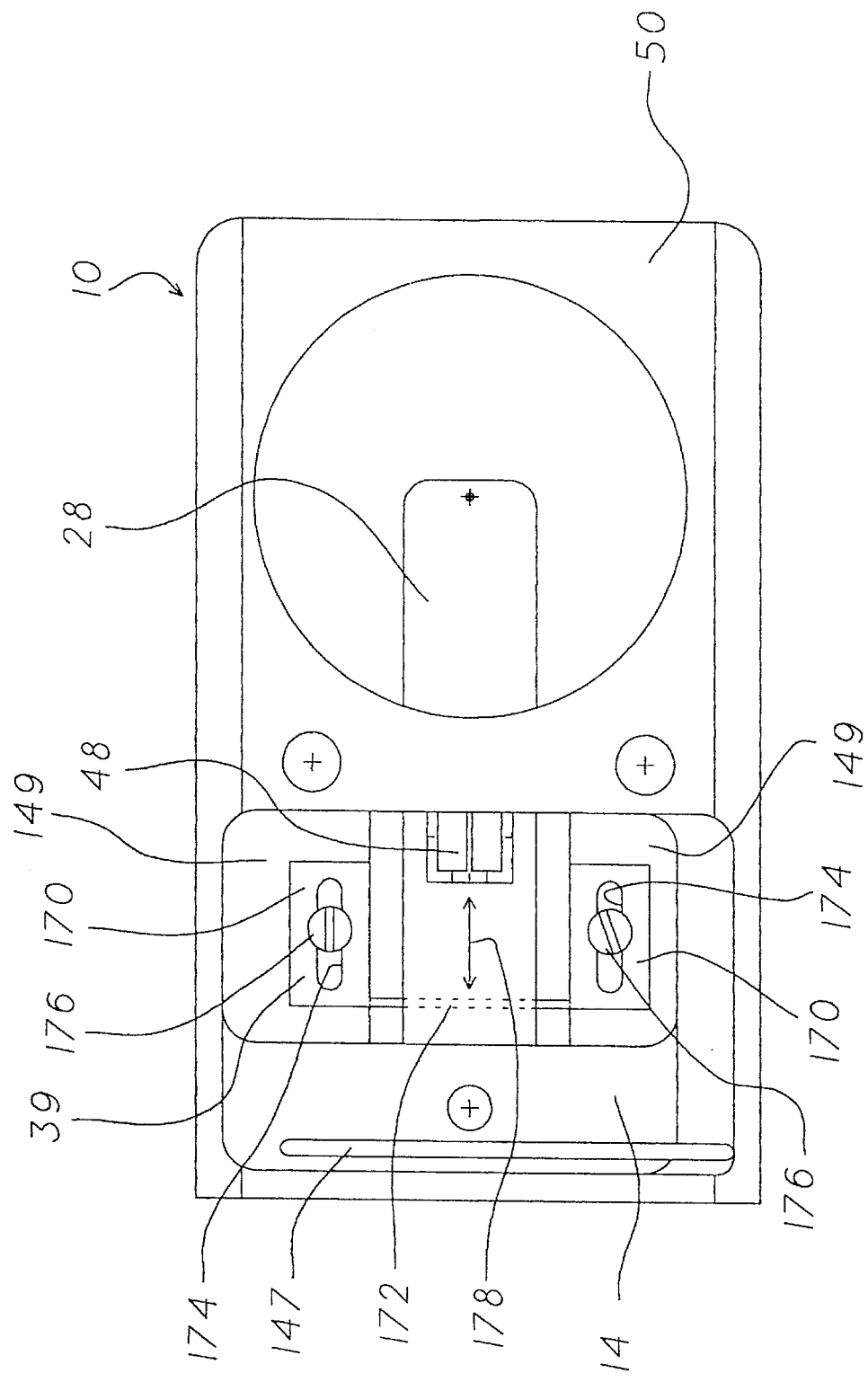
FIG. 18 is an underside view of the linear position transducer of FIG. 1, showing the strain gauge sensitivity adjuster.

FIG. 18 shows the design of the strain gauge sensitivity adjuster 39. Sensitivity adjuster 39 is comprised of two generally flat side plates 170 joined by a bridge 172. Side plates 170 each include a short slot 174. Screws 176 securely mount side plates 170 to base 14. Slots 174 and screws 176 provide for longitudinal adjustment of sensitivity adjuster 39 along cantilever beam 28, as indicated by arrow 178. Adjustment of sensitivity adjuster 39 toward strain gauge 48 increases the sensitivity of the strain gauge, and adjustment away from the stain gauge decreases the strain gauge's sensitivity.

Figure 19:
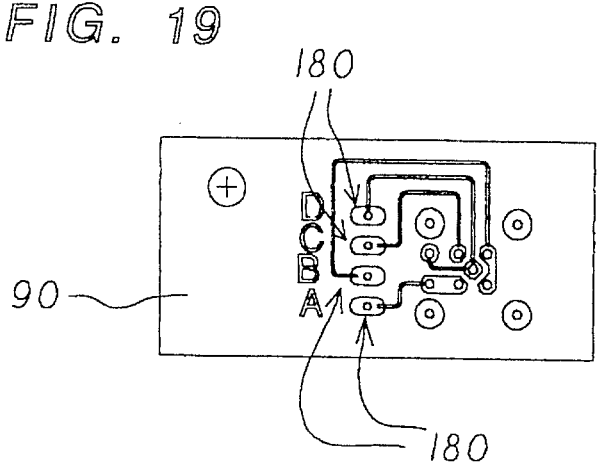
FIG. 19 is a schematic diagram of the PC board for the transducer.
Figure 20:
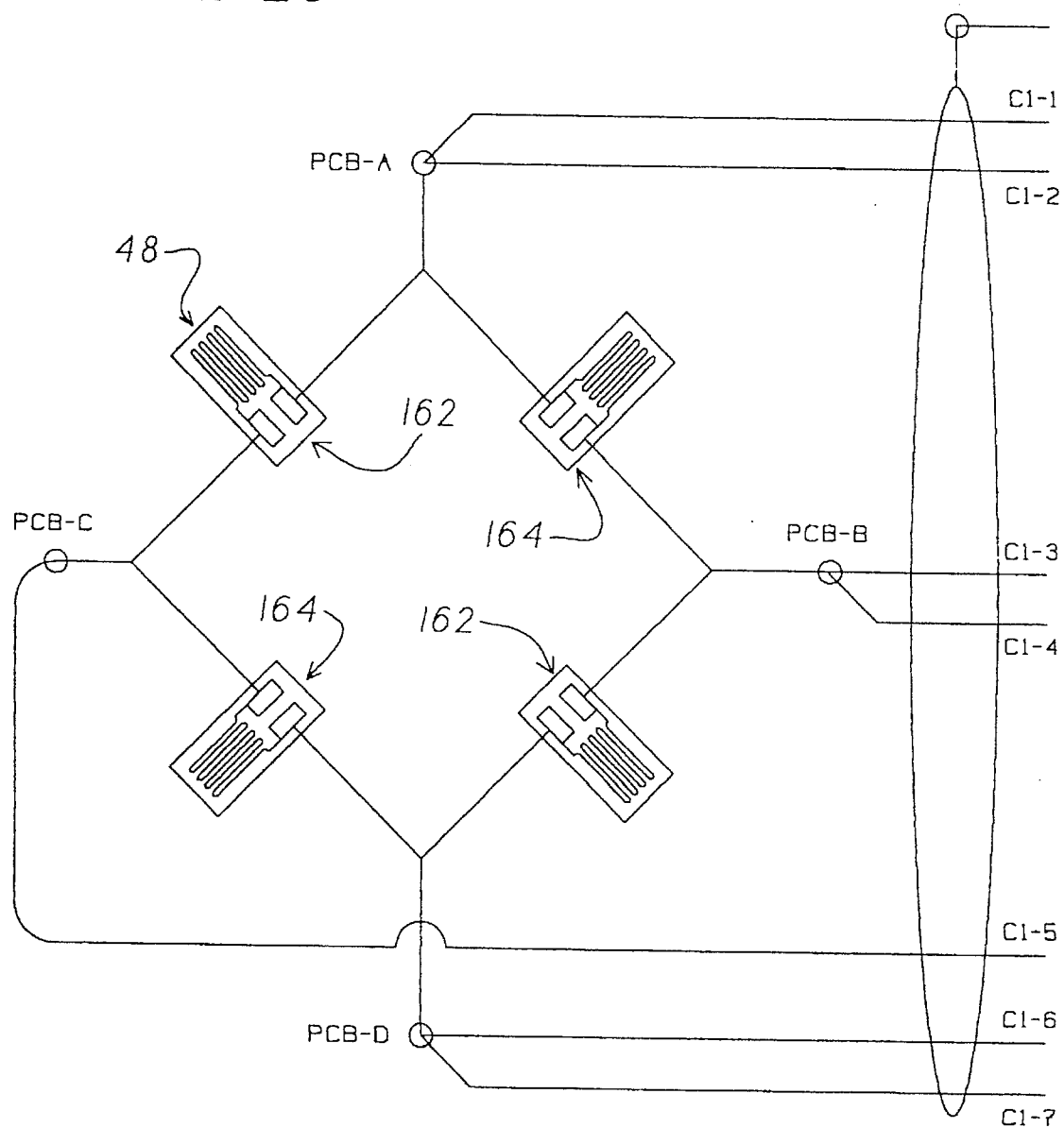
FIG. 20 is a circuit diagram of the strain gauge assembly.

FIG. 19 illustrates the circuitry for PC board 90. Connections 180 connect to strain gauge assembly 48, shown schematically in FIG. 20. FIG. 20 illustrates a conventional full wheatstone bridge circuitry for strain gauge assembly 48. Gauges 162 are mounted to one common side of cantilever beam 28, while gauges 164 are mounted to the opposite side. Junctions PCB-A, PCB-B, PCB-C, and PCB-D in FIG. 20 correspond to points A, B, C, and D of FIG. 19. The rest of the FIG. 20 should be easily understood by those skilled in the art.

The input range of movement for the transducer is primarily a function of the thread pitch of threaded inserts 68,70 and threaded stud 56, and the diameter of drum 26. Obviously, the greater the thread pitch and the larger the diameter of the drum, the narrower the range in which the transducer can operate.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalence and reversal of parts.

What is claimed is:

1. A linear transducer, comprising:

a support structure, a threaded stud fixedly secured to the support structure, a rotatable drum thread-mounted on the threaded stud, whereby, as the drum rotates, the drum moves axially along the stud, a string having a free end and an end secured to the drum, whereby linear movement of the free end causes rotation of the drum, a spring positioned within the drum, and having one end fixed and the other end connected to the drum, for providing retraction torque to return the drum to an initial position, a cantilever beam having a first end fixed to the support structure and a second end contacting the drum, and a strain gauge for measuring deflection-induced strain in the cantilever beam, whereby as the drum moves axially along the threaded stud, the drum moves the second end of the cantilever beam, causing deflection of the cantilever beam, which deflection is detected as strain that is proportional to the linear movement of the free end of the string.

2. The linear transducer of claim 1, wherein the drum includes a first and second threaded insert for thread-mounting of the threaded stud, and an internally-threaded axial passageway for anchoring the threaded inserts, the threaded inserts being adjustably positionable along the threaded stud toward and away from each other to tighten the threaded connection between the inserts and the threaded stud.

3. The linear transducer of claim 1, wherein the relative positions of the cantilever beam and the drum are such that when the drum is in said initial position, the second end of the cantilever beam is at least partially deflected.

4. The linear transducer of claim 1, wherein the drum includes wear plates adjacent side edges of the spring to prevent wear on the drum and support structure caused by the spring.

5. The linear transducer of claim 2, wherein the thread pitch of the threaded connection between the threaded inserts and the threaded stud is at least as great as the diameter of the string.

6. The linear transducer of claim 1, and further including a plastic guide secured to the support structure, the plastic guide including a hole for receiving the string.

7. The linear transducer of claim 2, wherein the drum includes a central cylindrical core, which includes the axial passageway, a spool portion around which the string is wound, a disc portion connecting the spool portion and the central cylindrical core, and an actuator button closing off one end of the axial passageway, the second end of the cantilever beam contacting the actuator button.

8. The linear transducer of claim 7, wherein the actuator button is secured to one of the threaded inserts and includes a pair of cutouts along the periphery of the actuator button to receive a tool for removing the actuator and threaded insert from the drum.

9. The linear transducer of claim 1, and further comprising an adjustable sensitivity selector operably coupled to the cantilever beam, for selectively limiting the length of the cantilever beam subject to deflection.

10. A transducer comprising:

a support structure, a threaded stud fixedly secured to the support structure, a drum rotatably mounted on the threaded stud, the drum operably connected to a source for rotating the drum, whereby rotation of the drum causes the drum to move axially along the threaded stud; and an output source responsive to axial movement of the drum, for producing of output signal proportional to rotary movement of the drum, wherein the output source includes a cantilever beam and a strain gauge, the cantilever beam being responsive to axial movement of the drum and the strain gauge producing the output signal proportional to rotary movement of the drum.

* * * * *